(12) United States Patent
Da et al.

(10) Patent No.: US 10,973,031 B2
(45) Date of Patent: Apr. 6, 2021

(54) RESOURCE CONFIGURATION METHOD AND DEVICE, AND COMPUTER STORAGE MEDIUM

(71) Applicant: China Academy of Telecommunications Technology, Beijing (CN)

(72) Inventors: Ren Da, Beijing (CN); Tie Li, Beijing (CN); Ekpenyong Tony, Beijing (CN); Fang-Chen Cheng, Beijing (CN); Qiubin Gao, Beijing (CN); Bin Ren, Beijing (CN); Zheng Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/764,376

(22) PCT Filed: Oct. 24, 2018

(86) PCT No.: PCT/CN2018/111749
§ 371 (c)(1),
(2) Date: May 14, 2020

(87) PCT Pub. No.: WO2019/095953
PCT Pub. Date: May 23, 2019

(65) Prior Publication Data
US 2020/0359384 A1  Nov. 12, 2020

(30) Foreign Application Priority Data

Nov. 14, 2017  (CN) .......................... 201711122934.2

(51) Int. Cl.
*H04L 27/26* (2006.01)
*H04W 72/04* (2009.01)
(Continued)

(52) U.S. Cl.
CPC ...... *H04W 72/0493* (2013.01); *H04W 56/001* (2013.01); *H04W 72/005* (2013.01); *H04W 72/0453* (2013.01); *H04W 76/28* (2018.02)

(58) Field of Classification Search
CPC .............. H04L 27/2602; H04L 5/0053; H04L 27/2655; H04L 5/0094; H04L 5/0082;
(Continued)

(56) References Cited

U.S. PATENT DOCUMENTS

| 2009/0069023 A1 | 3/2009 | Ahn et al. |
| 2018/0132168 A1* | 5/2018 | Ingale ................. H04W 72/042 |

(Continued)

FOREIGN PATENT DOCUMENTS

| CN | 101578902 A | 11/2009 |
| CN | 102007808 A | 4/2011 |

(Continued)

OTHER PUBLICATIONS

LG Electronics "RMSI delivery and CORESET configuration", 3GPP TSG RAN WG1 Meeting #90 Prague, Czech Republic, Aug. 21-25, 2017, total 8 pages, R1-171325.

(Continued)

*Primary Examiner* — Jung Liu
(74) *Attorney, Agent, or Firm* — Kilpatrick Townsend & Stockton, LLP

(57) ABSTRACT

Disclosed are a resource configuration method and device, and a computer storage medium, for enabling configuration of a remaining minimum system information control resource set to be more flexibly when the remaining minimum system information control resource set and an associated synchronous information block occupy a same beam by means of frequency division multiplexing, so as to be applicable to more application scenarios. The resource configuration method provided by the present application com- (Continued)

prises: determining that a remaining minimum system information control resource set and an associated synchronous information block occupy a same beam by means of frequency division multiplexing; and determining configuration parameters of the remaining minimum system information control resource set and the associated synchronous information block, wherein the configuration parameters of the remaining minimum system information control resource set associated with the synchronous information blocks in each synchronous information block burst set are the same.

14 Claims, 6 Drawing Sheets

(51) Int. Cl.
*H04W 76/28* (2018.01)
*H04W 56/00* (2009.01)
*H04W 72/00* (2009.01)

(58) Field of Classification Search
CPC . H04L 5/0023; H04L 5/0051; H04L 25/0224; H04L 27/2676; H04L 25/022; H04L 5/00; H04L 5/0035; H04B 7/0417; H04B 7/0617; H04B 7/0695; H04W 48/16; H04W 72/1289; H04W 72/042; H04W 72/046
See application file for complete search history.

(56) References Cited

U.S. PATENT DOCUMENTS

| | | | | |
|---|---|---|---|---|
| 2018/0192383 | A1* | 7/2018 | Nam | H04L 5/0044 |
| 2018/0324843 | A1* | 11/2018 | Lee | H04W 72/1289 |
| 2018/0337757 | A1* | 11/2018 | Noh | H04L 5/0048 |
| 2018/0368145 | A1* | 12/2018 | Abdoli | H04L 5/00 |
| 2019/0007124 | A1* | 1/2019 | Seo | H04L 5/0044 |
| 2019/0044631 | A1* | 2/2019 | Davydov | H04L 25/0224 |
| 2019/0069322 | A1* | 2/2019 | Davydov | H04W 74/006 |
| 2019/0089447 | A1* | 3/2019 | Sang | H04W 36/00837 |
| 2019/0098590 | A1* | 3/2019 | Nam | H04W 24/08 |
| 2019/0104500 | A1* | 4/2019 | Reial | H04L 5/0091 |
| 2019/0149383 | A1* | 5/2019 | Ko | H04W 72/04 370/329 |
| 2019/0208550 | A1* | 7/2019 | Ko | H04W 72/0446 |
| 2019/0229867 | A1* | 7/2019 | Yi | H04L 5/0048 |
| 2019/0356524 | A1* | 11/2019 | Yi | H04L 27/2602 |
| 2019/0387412 | A1* | 12/2019 | Kim | H04W 56/001 |
| 2020/0068512 | A1* | 2/2020 | Xue | H04W 56/001 |
| 2020/0092946 | A1* | 3/2020 | Xiong | H04L 1/0071 |
| 2020/0154376 | A1* | 5/2020 | Ko | H04W 76/11 |
| 2020/0162217 | A1* | 5/2020 | Liu | H04L 1/00 |
| 2020/0178148 | A1* | 6/2020 | Lee | H04L 5/001 |
| 2020/0178253 | A1* | 6/2020 | Gao | H04W 72/04 |
| 2020/0187159 | A1* | 6/2020 | Ko | H04L 5/0051 |
| 2020/0213960 | A1* | 7/2020 | Jung | H04W 72/1257 |
| 2020/0220703 | A1* | 7/2020 | Kim | H04L 27/26 |
| 2020/0221508 | A1* | 7/2020 | Huang | H04W 68/02 |
| 2020/0236729 | A1* | 7/2020 | Ahn | H04L 5/0048 |
| 2020/0260413 | A1* | 8/2020 | Hong | H04W 72/02 |
| 2020/0267041 | A1* | 8/2020 | Kim | H04L 27/2665 |

FOREIGN PATENT DOCUMENTS

| | | |
|---|---|---|
| CN | 102752858 A | 10/2012 |
| CN | 105519167 A | 4/2016 |

OTHER PUBLICATIONS

Vivo,"Discussion on Remaining Minimum System Information", 3GPP TSG RAN WG1 Meeting #90bis, Prague, Czech Republic, Oct. 9-13, 2017, total 15 pages, R1-1717461.

Qualcomm Incorporated, "Remaining system information delivery consideration", 3GPP TSG RAN WG1 Meeting 90bis, Prague, Oct. 9-13, 2017, total 9 pages, R1-1718528.

Nokia et al.,"Remaining Details on Remaining Minimum System Information", 3GPP TSG-RAN WG1 NR AH#3, Prague, Czech Republic Oct. 9-13, 2017, total 9 pages, R1-1718613.

* cited by examiner

SSB (Synchronization Signal/PBCH Block)CS (Subcarrier Spacing)

SSB (Synchronization Signal/PBCH Block)CS (Subcarrier Spacing)

SSB (Synchronization Signal/PBCH Block) CS (Subcarrier Spacing)

RESOURCE CONFIGURATION METHOD AND DEVICE, AND COMPUTER STORAGE MEDIUM

The present application is a US National Stage of International Application No. PCT/CN2018/111749, filed Oct. 24, 2018, which claims priority from Chinese Patent Application No. 201711122934.2, filed with the Chinese Patent Office on Nov. 14, 2017 and entitled "Resource Configuration Method and Device, and Computer Storage Medium", which is hereby incorporated by reference in its entirety.

FIELD

The present application relates to the field of communication technologies, and particularly to a resource configuration method and device and a computer storage medium.

BACKGROUND

The Minimum System Information (MSI) is the system information necessary for a terminal to make the initial access, wherein a part of the minimum system information is transmitted through the New Radio (NR)-Physical Broadcasting Channel (PBCH), which is called NR-PBCH for short, while the Remaining Minimum System Information (RMSI) is transmitted through the NR-PDSCH. In addition, the NR-PDSCH for transmitting the RMSI is scheduled by the NR-PDCCH. This NR-PDCCH (used to schedule the NR-PDSCH canving the RMSI) is indicated by the configuration information of the RMSI Control Resource Set (CORESET), wherein the configuration information of the RMSI CORESET is transmitted over the NR-PBCH. As discussed in the current standard, the maximum bit width of the configuration information of the RMSI CORESET is 8 bits.

Each RMSI CORESET is associated with one Synchronization SignalPhysical Broadcast Channel block (SS/PBCH block, also referred to as SSB). The RMSI CORESET and the SS/PBCH block have two multiplexing modes, namely Frequency Division Multiplexing (FDM) or Time Division Multiplexing (TDM), wherein the RMSI CORESET associated with the SS/PBCH block may occupy the same number of symbols as this SS/PBCH block in the time domain during frequency division multiplexing. The frequency domain multiplexing scheme may enables the RMSI CORESET and the associated SS/PBCH block to be transmitted on the same beam, which is very suitable for the analog beam scanning mode.

SUMMARY

The embodiments of the present application provide a resource configuration method and device, and a computer storage medium, so as to enable the configuration of the remaining minimum system information control resource set to be more flexible when the remaining minimum system information control resource set and the associated SS/PBCH block occupy the same beam in the frequency division multiplexing mode, and to be applicable to more application scenarios.

A resource configuration method provided by an embodiment of the present application includes:

determining that a remaining minimum system information control resource set and an associated SS/PBCH block occupy a same beam in a frequency division multiplexing mode;

determining configuration parameters of the remaining minimum system information control resource set and the associated SS/PBCH block, wherein remaining minimum system information control resource sets associated with all SS/PBCH blocks in each SS/PBCH block burst set have same configuration parameters.

With this method, it is determined that the remaining minimum system information control resource set and the associated SS/PBCH block occupy the same beam in the frequency division multiplexing mode; and the configuration parameters of the remaining minimum system information control resource set and the associated SS/PBCH block are determined, wherein the remaining minimum system information control resource sets associated with all the SS/PBCH blocks in each SS/PBCH block burst set have the same configuration parameters, to thereby enable the configuration of the remaining minimum system information control resource set to be more flexible when the remaining minimum system information control resource set and the associated SS/PBCH block occupy the same beam in the frequency division multiplexing mode, and to be applicable to more application scenarios.

In one embodiment, the configuration parameters of the remaining minimum system information control resource set include one or any combination of:

the bandwidth occupied by the remaining minimum system information control resource set:

the frequency-domain position of the remaining minimum system information control resource set;

the number of continuous or discontinuous time-domain symbols occupied by the remaining minimum system information control resource set;

the time-domain position of the remaining minimum system information control resource set.

In one embodiment, the time-domain position of the remaining minimum system information control resource set is a relative offset value with respect to the associated SS/PBCH block.

In one embodiment, a time-domain start position of the remaining minimum system information control resource set is aligned with a start symbol of the associated SS/PBCH block, or a time-domain end position of the remaining minimum system information control resource set is aligned with an end symbol of the associated SS/PBCH block.

In one embodiment, the frequency-domain position of the configured remaining minimum system information control resource set and the frequency-domain position the associated SS/PBCH block satisfy one of the following relationships:

the remaining minimum system information control resource set and the associated SS/PBCH block share a center frequency-domain position, and the remaining minimum system information control resource set is divided into two parts which are symmetrically distributed at upper and lower sides of the associated SS/PBCH block respectively;

the frequency-domain position of the whole remaining minimum system information control resource set is located below the frequency-domain position of the associated SS/PBCH block;

the frequency-domain position of the whole remaining minimum system information control resource set is located above the frequency-domain position of the associated SS/PBCH block.

In one embodiment, the number of continuous or discontinuous time-domain symbols occupied by the remaining minimum system information control resource is 1, 2, 3, 4, 6 or 8.

In one embodiment, the bandwidth occupied by the remaining minimum system information control resource set is one of the following sets: {48, 72, 96}, {24, 36, 48}, {16, 24, 32}, {12, 18, 24}, {8, 12, 16}, {6, 9, 12}.

In one embodiment, the relative offset granularity of the frequency-domain position of the remaining minimum system information control resource set and the frequency-domain position of the associated SS/PBCH block is a preset value.

In one embodiment, the relative offset granularity has different values in different frequency bands or frequency ranges.

In one embodiment, the preset value is a value greater than or equal to zero.

A resource configuration device provided by an embodiment of the present application includes:

a memory configured to store program instructions:

a processor configured to invoke the program instructions stored in the memory, and according to the obtained program, perform the process of:

determining that a remaining minimum system information control resource set and an associated SS/PBCH block occupy a same beam in a frequency division multiplexing mode:

determining configuration parameters of the remaining minimum system information control resource set and the associated SS/PBCH block, wherein remaining minimum system information control resource sets associated with all SS/PBCH blocks in each SS/PBCH block burst set have same configuration parameters.

In one embodiment, the configuration parameters of the remaining minimum system information control resource set include one or any combination of:

the bandwidth occupied by the remaining minimum system information control resource set;

the frequency-domain position of the remaining minimum system information control resource set:

the number of continuous or discontinuous time-domain symbols occupied by the remaining minimum system information control resource set:

the time-domain position of the remaining minimum system information control resource set.

In one embodiment, the time-domain position of the remaining minimum system information control resource set is a relative offset value with respect to the associated SS/PBCH block.

In one embodiment, a time-domain start position of the remaining minimum system information control resource set is aligned with a start symbol of the associated SS/PBCH block, or a time-domain end position of the remaining minimum system information control resource set is aligned with an end symbol of the associated SS/PBCH block.

In one embodiment, the frequency-domain position of the remaining minimum system information control resource set and the frequency-domain position of the associated SS/PBCH block satisfy one of the following relationships:

the remaining minimum system information control resource set and the associated SS/PBCH block share a center frequency-domain position, and the remaining minimum system information control resource set is divided into two parts which are symmetrically distributed at upper and lower sides of the associated SS/PBCH block respectively:

the frequency-domain position of the whole remaining minimum system information control resource set is located below the frequency-domain position of the associated SS/PBCH block;

the frequency-domain position of the whole remaining minimum system information control resource set is located above the frequency-domain position of the associated SS/PBCH block.

In one embodiment, the number of continuous or discontinuous time-domain symbols occupied by the remaining minimum system information control resource is 1, 2, 3, 4, 6 or 8.

In one embodiment, the bandwidth occupied by the remaining minimum system information control resource set is one of the following sets: {48, 72, 96}, {24, 36, 48}, {16, 24, 32}, {12, 18, 24}, {8, 12, 16}, {6, 9, 12}.

In one embodiment, the relative offset granularity of the frequency-domain position of the remaining minimum system information control resource set and the frequency-domain position of the associated SS/PBCH block is a preset value.

In one embodiment, the relative offset granularity has different values in different frequency bands or frequency ranges.

In one embodiment, the preset value is a value greater than or equal to zero.

Another resource configuration device provided by an embodiment of the present application includes:

a first unit configured to determine that a remaining minimum system information control resource set and an associated SS/PBCH block occupy a same beam in a frequency division multiplexing mode;

a second unit configured to determine configuration parameters of the remaining minimum system information control resource set and the associated SS/PBCH block, wherein remaining minimum system information control resource sets associated with all SS/PBCH blocks in each SS/PBCH block burst set have same configuration parameters.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION

In order to make the objects, technical solutions and advantages of the invention clearer, the technical solutions in the embodiments of the invention will be described clearly and completely below in combination with the accompanying drawings in the embodiments of the invention. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the invention, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

The embodiments of the present application provide a resource configuration method and device, and a computer storage medium, so as to enable the configuration of the remaining minimum system information control resource set to be more flexible when the remaining minimum system information control resource set and the associated SS/PBCH block occupy the same beam in the frequency division multiplexing mode, and to be applicable to more application scenarios.

Figure 1:
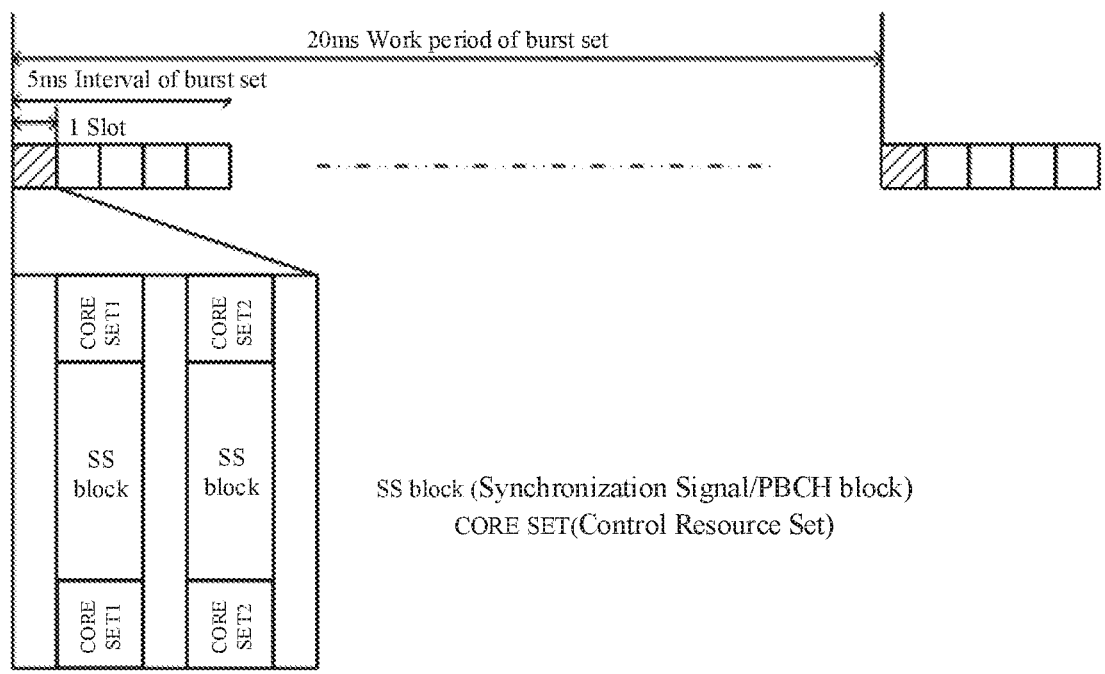
FIG. 1 is a schematic diagram of an RMSI CORESET configuration method in the frequency division multiplexing mode provided by an embodiment of the present application.

In the technical solution provided by the embodiments of the present application, the RMSI CORESET and the associated SS/PBCH block adopt the frequency division multiplexing mode. Referring to FIG. 1, in the frequency domain, the RMSI CORESET is equally divided into two parts which are symmetrically and compactly distributed at two sides of the SS/PBCH block; and in the time domain, the RMSI CORESET and the associated SS/PBCH block occupy the same number of symbols. Here, for the RMSI CORESET and the associated SS/PBCH block, the configuration information of the RMSI CORESET is notified through the PBCH contained in the SS/PBCH block, so the RMSI CORESET is associated with the SS/PBCH block.

Some special designs are required in some application scenarios. For example, in the New Radio (NR) technology, the SS/PBCH block may not be in the center position of the bandwidth, so the above configuration method (placing at two sides of the SS/PBCH block uniformly, symmetrically and compactly) shown in FIG. 1 may encounter some problems. For another example, in order to avoid the neighboring cell interference, the RMSI CORESETs and SS/PBCH blocks may be deployed in the staggered way and do not overlap among adjacent cells in the frequency domain.

Figure 2:
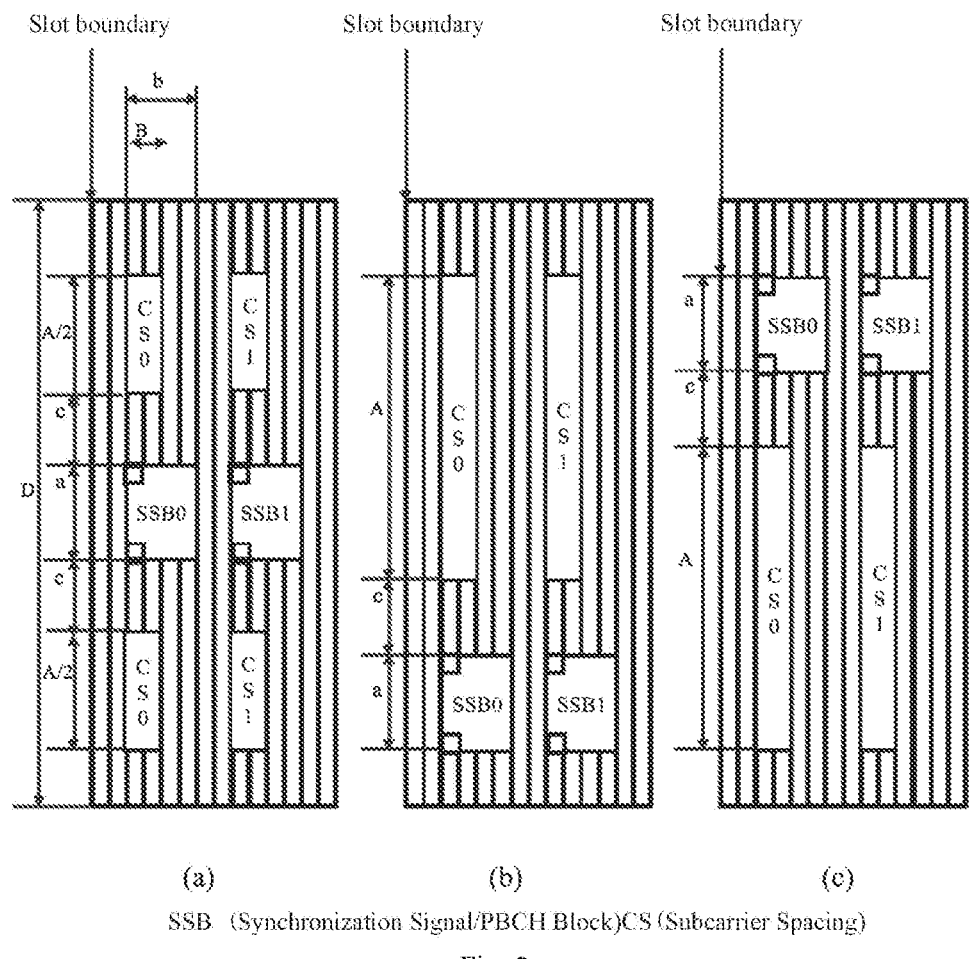
FIG. 2 is a schematic diagram of an FDM configuration method when the SS/PBCH block Subcarrier Spacing (SCS) and the RMSI CORESET SCS are respectively configured as {15, 15}, {30, 30}, {120, 120} kHz provided by an embodiment of the present application.
Figure 3:
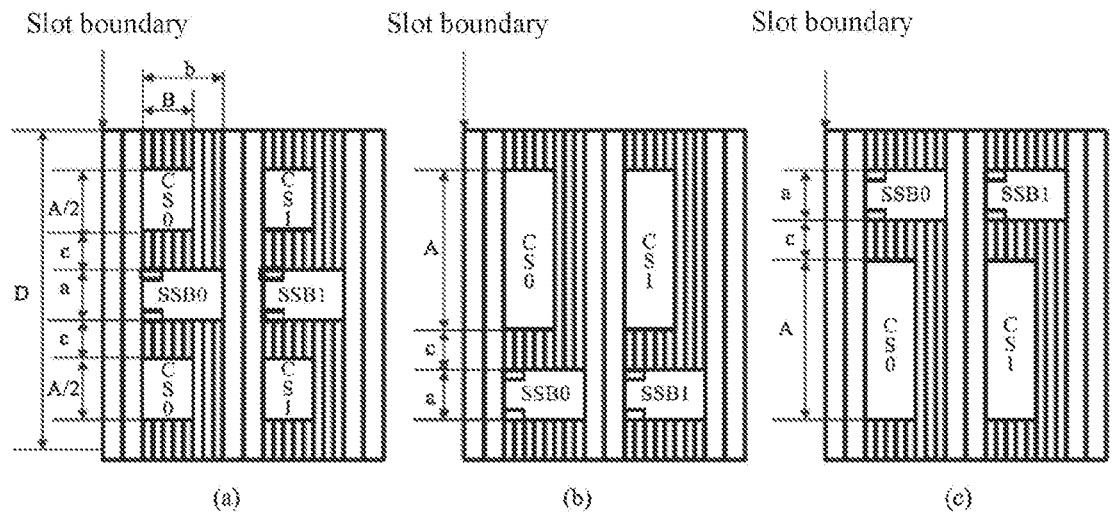
FIG. 3 is a schematic diagram of an FDM configuration method when the SS/PBCH block SCS and the RMSI CORESET SCS are configured as {15, 30} kHz provided by an embodiment of the present application.
Figure 4:
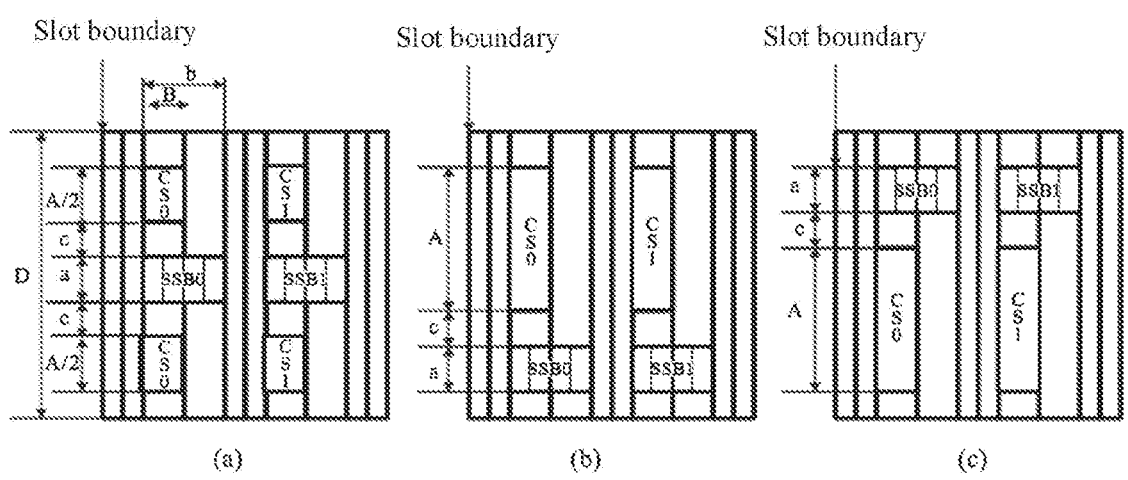
FIG. 4 is a schematic diagram of an FDM configuration method when the SS/PBCH block SCS and the RMSI CORESET SCS are respectively configured as {30, 315}, {60, 30}, {240, 120} kHz provided by an embodiment of the present application.
Figure 5:
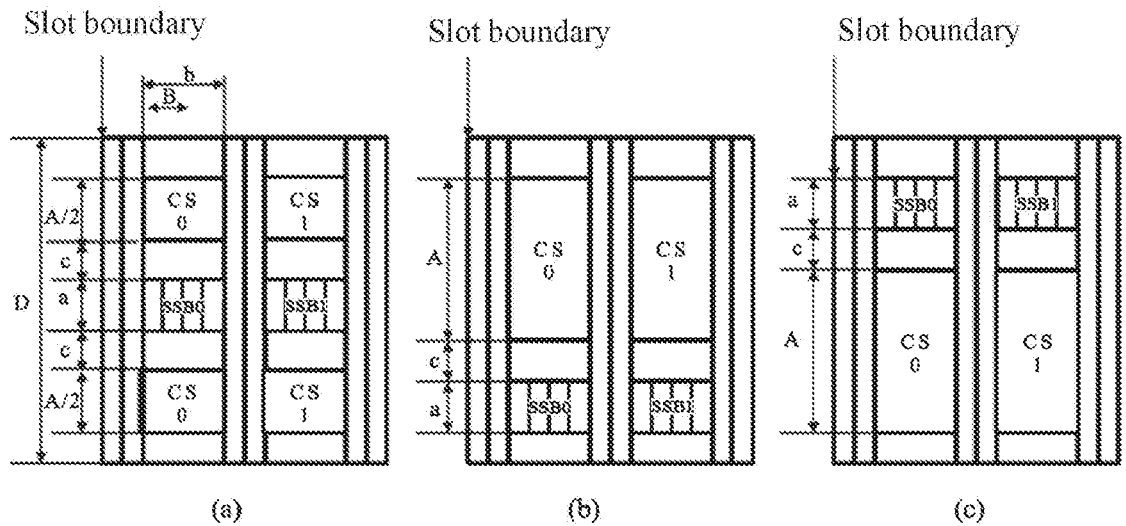
FIG. 5 is a schematic diagram of an FDM configuration method when the SS/PBCH block SCS and the RMSI CORESET SCS are configured as {240, 60} kHz provided by an embodiment of the present application.

When the system bandwidth is greater than the bandwidth of the SS/PBCH block, the RMSI CORESET and the SS/PBCH block may adopt the frequency division multiplexing mode, as shown in FIG. 2.

Regardless of single-beam and multi-beam scenarios, the RMSI CORESET and the associated SS/PBCH block are transmitted over the same beam. The terminal monitors the corresponding RMSI CORESET while monitoring the SS/PBCH block. Especially in the simulation beam scanning scenario, the RMSI CORESET and the associated SS/PBCH block are transmitted over the same beam, so no additional time-domain symbol resources are needed to transmit the RMSI CORESET.

In addition, the SS/PBCH block Subcarrier Spacing (SCS) and the RMSI CORESET SCS may be same or different. The configuration sets of the SS/PBCH block SCS and RMSI CORESET SCS are shown in Table 1 and shown in FIGS. 2 to 5:

TABLE 1

| Combination Number | {SS/PBCH block SCS (kHz), RMSI SCS (kHz)} |
|---|---|
| 1 | {15, 15} |
| 2 | {15, 30} |
| 3 | {30, 15} |
| 4 | {30, 30} |
| 5 | {120, 60} |
| 6 | {120, 120} |
| 7 | {240, 60} |
| 8 | {240, 120} |

It should be noted that, in FIGS. 2 to 5, 'A' is the bandwidth occupied by the RMSI CORESET, with the Physical Resource Block (PRB) as the granularity; 'B' is the number of continuous time-domain symbols occupied by the RMSI CORESET; 'D' is the minimum carrier bandwidth of the terminal, with the PRB as the granularity; 'a' is the bandwidth occupied by the SS/PBCH block; 'b' is the number of time-domain symbols occupied by the SS/PBCH block; and 'c' is the indication of the frequency-domain offset of the RMSI CORESET relative to the SS/PBCH block, with the PRB also as the granularity.

At the same center carrier frequency, the NR-PBCHs in all SS/PBCH blocks in the SS/PBCH block burst set carry the same content except for the SS/PBCH block index. Therefore, regardless of whether the RMSI CORESET and SS/PBCH block adopt the FDM or TDM, the RMSI CORE-SETs associated with all SS/PBCH blocks in the SS/PBCH block burst should have the same configuration (for example, the same occupied bandwidth, frequency-domain position, occupied time-domain symbols, etc.) at the same center carrier frequency.

Therefore, In one embodiment, regardless of whether the RMSI CORESET and the SS/PBCH block adopt the FDM or TDM mode, at the same center carrier frequency, the RMSI CORESET associated with each SS/PBCH block in one SS/PBCH block burst has the same configuration parameters as follows:

the bandwidth occupied by the RMSI CORESET (shown as 'A' in FIG. 2);
the frequency-domain position of the RMSI CORESET;
the number of continuous or discontinuous time-domain symbols occupied by the RMSI CORESET (shown as 'B' in FIG. 2).

It is assumed that there is the same occupied bandwidth on each time-domain symbol occupied by the RMSI CORE-SET, that is, 'A' is the same value on each time-domain symbol occupied by the RMSI CORESET. Therefore, the total number of PRBs occupied by the RMSI CORESET may be calculated for example by using following the formula.

The total number of PRBs occupied by the RMSI CORESET=the occupied bandwidth of each time-domain symbol * the number of occupied continuous time-domain symbols='A'*'B'.

Furthermore, for the FDM mode, the number of continuous time-domain symbols occupied by the RMSI CORESET may be configured to be the same as that of the SS/PBCH block, for example, 'B'=4. If the terminal minimum bandwidth is large enough, the number of continuous time-domain symbols occupied by the RMSI CORESET may also be different from that of the SS/PBCH block. Further, compared to the allocation, definition and configuration of the frequency-domain bandwidth and the number of continuous time-domain symbols occupied by the RMSI CORESET, it is more effective to define multiple parameter sets {the number of occupied continuous or non-continuous time-domain symbols, occupied bandwidth} for configuration based on the number of required PRBs.

At the same time, the reliable transmission of the NR-PDCCH carrying the RMSI scheduling is considered. The total number of PRBs occupied by the NR-PDCCH should be at least 48 PRBs, so as to support the aggregation level 8 of the NR-PDCCH. Therefore, for example, the candidate set of the total number of PRBs occupied by the NR-PDCCH is {48, 72, 96} PRBs.

When the MIST CORESET and the associated SS/PBCH block adopt the frequency division multiplexing mode, the RMSI CORESET configuration information includes at least a parameter set {the occupied bandwidth, the number of occupied continuous or discontinuous time-domain symbols}.

For example: when the RMSI CORESET and the associated SS/PBCH block adopt the frequency division multiplexing mode, the RMSI CORESET configuration information may include the parameter set {the occupied bandwidth, the number of occupied continuous or discontinuous time-domain symbols}, as shown in Table 2 below

TABLE 2

RMSI CORESET {the occupied bandwidth, the number of occupied continuous or discontinuous time-domain symbols} configuration parameter set

| The number of occupied continuous or discontinuous time-domain symbols | The occupied bandwidth (PRBs) | Note |
|---|---|---|
| 1 | {48, 72, 96} | |
| 2 | {24, 36, 48} | Not support under {SS/PBCH block SCS, RMSI SCS} = {240, 60} kHz configuration |
| 3 | {16, 24, 32} | Not support under {SS/PBCH block SCS, RMSI SCS} = {30, 15}, {120, 60}, {240, 60}, {240, 120} kHz configuration |
| 4 | {12, 18, 24} | Not support under {SS/PBCH block SCS, RMSI SCS} = {30, 15}, {120, 60}, {240, 60} {240, 120} kHz configuration |
| 6 | {8, 12, 16} | Support only under {SS/PBCH block SCS, RMSI SCS} = {15, 30} kHz configuration |
| 8 | {6, 9, 12} | Support only under {SS/PBCH block SCS, RMSI SCS} = {15, 30} kHz |

In order to minimize the bit number of the RMSI CORE-SET configuration information carried by the NR-PBCH, the time-domain position of the RMSI CORESET may be a relative offset value with respect to the associated SS/PBCH block. The time-domain start position of the RMSI CORE-SET may be aligned with the start symbol of the SS/PBCH block, or the time-domain end position of the RMSI CORE-SET is aligned with the end symbol of the SS/PBCH block. In this way, no matter how the number of continuous time-domain symbols occupied by the RMSI CORESET is configured, it can be ensured that the time-domain position of the RMSI CORESET is within the symbols occupied by the SS/PBCH block.

Therefore, In one embodiment, when the RMSI CORESET and the associated SS/PBCH block adopt the frequency division multiplexing mode, the time-domain position of the RMSI CORESET is a relative offset value with respect to the associated SS/PBCH block. The time-domain start position of the RMSI CORESET may be aligned with the start symbol of the SS/PBCH block, or the time-domain end position of the RMSI CORESET is aligned with the end symbol of the SS/PBCH block.

The following content supports all cases, including all configuration sets of the SS/PBCH block SCS and the RMSI CORESET SCS, and including all (the occupied bandwidth, the number of occupied continuous or discontinuous time-domain symbols) configuration sets of the RMSI CORESET.

The frequency-domain position of the RMSI CORESET should be specified by the frequency-domain offset position relative to the associated SS/PBCH block. Specifically, there are still many methods to achieve. For example, the reference points may be the center positions, start positions or end positions of the bandwidth occupied by the RMSI CORESET and the bandwidth occupied by the SS/PBCH block, respectively. For the FDM mode, three relative relationships may be considered, as shown in FIG. 2, wherein:

FIG. 2(*a*): the RMSI CORESET and the associated SS/PBCH block share the center frequency-domain position:

FIG. 2(*b*): the frequency-domain position of the RMSI CORESET is located below the frequency-domain position of the associated SS/PBCH block;

FIG. 2(*c*): the frequency-domain position of the RMSI CORESET is located above the frequency-domain position of the associated SS/PBCH block.

Therefore, In one embodiment, when the RMSI CORESET and the associated SS/PBCH block adopt the frequency division multiplexing mode, the frequency-domain position relationship between them may be one of the following relationships:

the RMSI CORESET and the associated SS/PBCH block share the central position; that is, one half of the RMSI CORESET is located above the associated SS/PBCH block and the other half is located below the associated SS/PBCH block, and the two halves are symmetrically distributed at two sides of the SS/PBCH block. For example, in FIG. 2(*a*), the CS0s (short for RMSI CORESET) at two sides of the SS/PBCH block0 (short for SS/PBCH block) constitutes a complete CS0, where these two CS0s are symmetrically distributed at two sides of the SS/PBCH block0, that is, the center of these two CS0s coincides with the center of the SS/PBCH block0 (the same is applicable to other embodiments, which will not be repeated later);

the whole RMSI CORESET is located below the associated SS/PBCH block; for example, in FIG. 2(*c*), the CS0 is located below the associated SS0 (the same is applicable to other embodiments, which will not be repeated later);

the whole RMSI CORESET is located above the associated SS/PBCH block; for example, in FIG. 2(*b*), the CS0 is located above the associated SS0 (the same is applicable to other embodiments, which will not be repeated later).

In order to minimize the bit number of the RMSI CORESET configuration information carried by the NR-PBCH, and in order to support the larger minimum terminal bandwidth, the granularity of the frequency-domain offset parameter 'c' in FIG. 2 may be multiple PRBs instead of one PRB.

Here, the granularity may be specified by the standard according to the carrier frequency, and different values may be configured for different carrier frequencies. For example, the granularities corresponding to a carrier frequency higher than 6 GHz and a carrier frequency lower than 6 GHz may be different. This granularity may also be determined according to the minimum terminal bandwidth or the maximum carrier frequency bandwidth in the frequency band. In addition, considering the frequency-domain allocation information of the CORESET notified by the terminal-specific RRC signaling, when the Resource Block Group (RBG) bit mapping mode is adopted, each RBG=6 RPBs, so the granularity of the frequency-domain offset parameter 'c' here may also be determined as 6 PRBs.

Therefore, In one embodiment, when the RMSI CORESET and the associated SS/PBCH block adopt the frequency division multiplexing mode, the granularity of the relative offset between the frequency-domain positions of them may be predefined by the standard, that is, c is a preset value, and different values may be used for different frequency bands or frequency ranges. For example, for the small terminal minimum bandwidth, the granularity may be 1 PRB; and for the large terminal minimum bandwidth, the granularity may be multiple PRBs, e.g., 6 PRBs. Generally, the frequency-domain position indication may be notified by up to 2 bits. In addition, only the 1-bit frequency-domain offset parameter may be used to indicate the minimum and maximum frequency-domain offset intervals.

Figure 6:
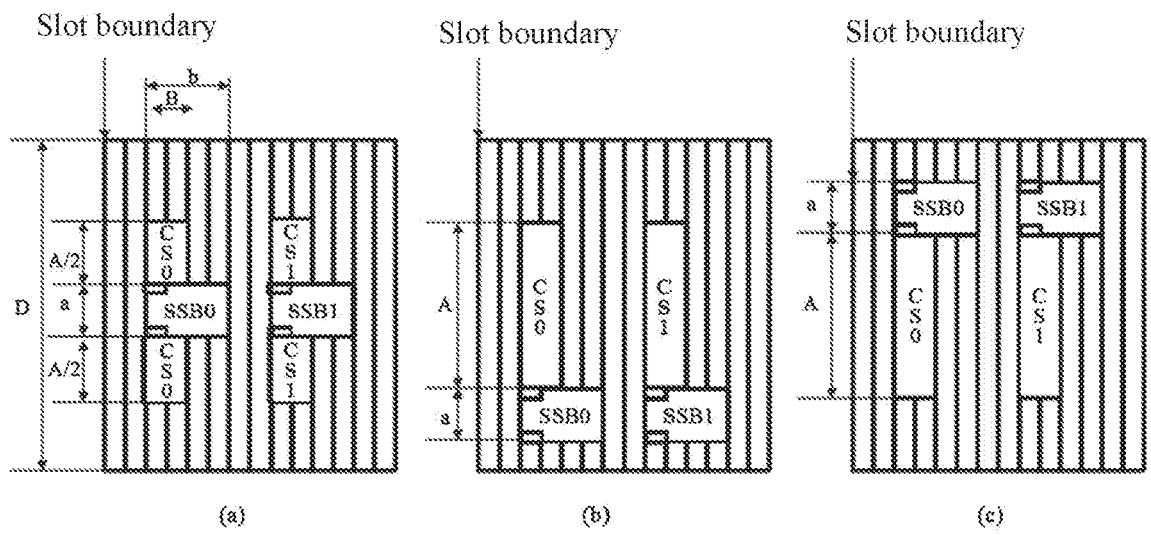
FIG. 6 is a schematic diagram of a scenario where the frequency-domain offset of the RMSI CORESET is indicated by 1 bit which is 0 in the frequency division multiplexing mode provided by an embodiment of the present application.
Figure 7:
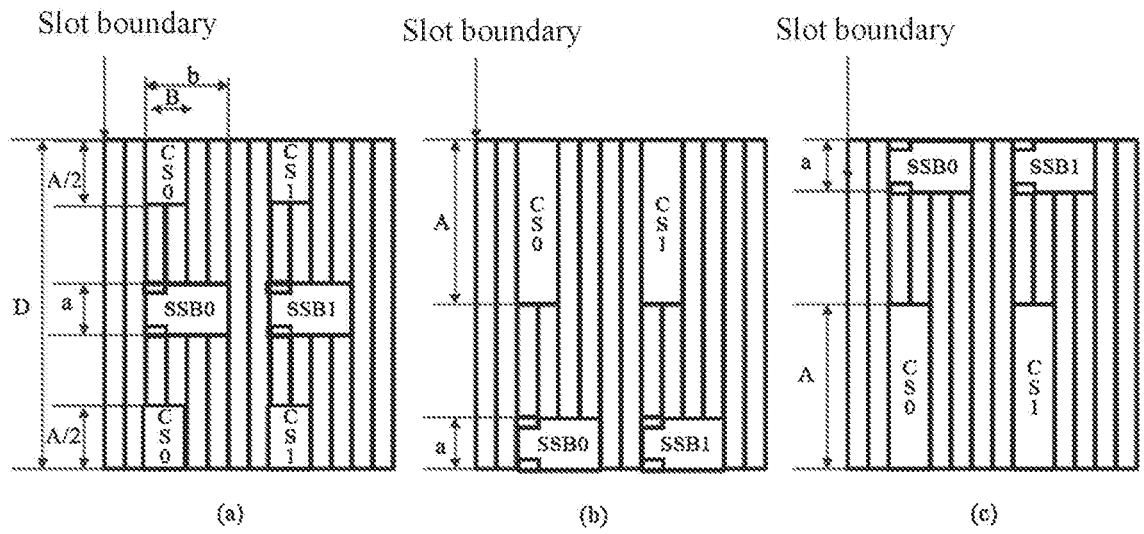
FIG. 7 is a schematic diagram of a scenario where the frequency-domain offset of the RMSI CORESET is indicated by 1 bit which is 1 in the frequency division multiplexing mode provided by an embodiment of the present application.

For example, when the frequency-domain position indication is indicated by 1 bit {0, 1}, if the indication is 0, the offset may be set as c=0, that is, there is no interval in the frequency domain between the RMSI CORESET and the associated SS/PBCH block, as shown in FIG. 6; if the indication is 1, that is, c=1, the RMSI CORESET and the associated SS/PBCH block occupy the entire terminal minimum bandwidth, and the interval in the frequency domain between them is maximized, as shown in FIG. 7.

Figure 8:
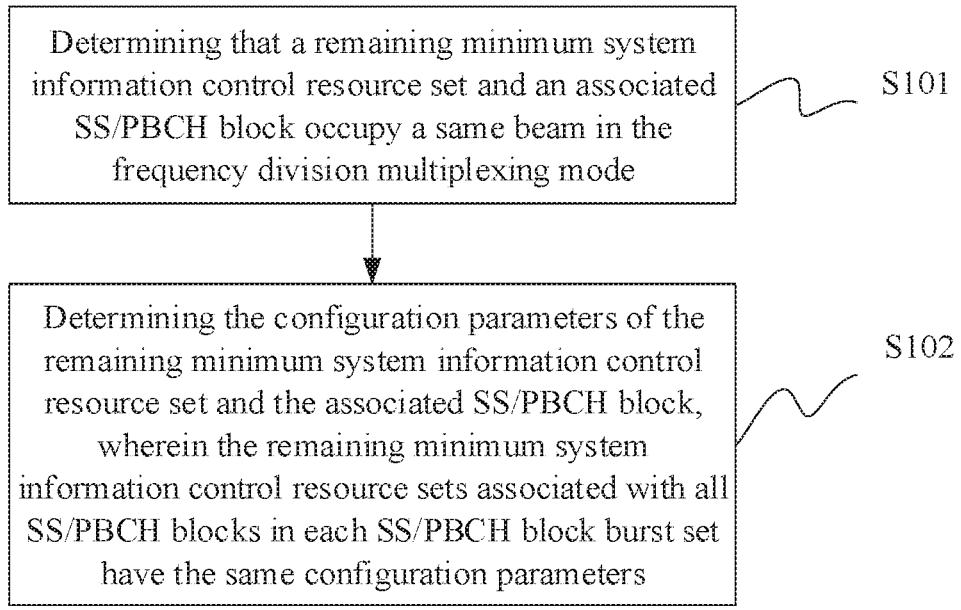
FIG. 8 is a flow schematic diagram of a resource configuration method provided by an embodiment of the present application.

In summary, referring to FIG. 8, a resource configuration method according to an embodiment of the present application includes:

S101: determining that a remaining minimum system information control resource set (RMSI CORESET) and an associated synchronization signal/physical broadcast channel block (SS/PBCH block) occupy a same beam in the frequency division multiplexing mode:

S102: determining the configuration parameters of the remaining minimum system information control resource set and the associated SS/PBCH block, wherein the remaining minimum system information control resource sets associated with all SS/PBCH blocks in each SS/PBCH block burst set have the same configuration parameters.

It should be noted that the method according to the embodiment of the present application may be executed at the network side or may be executed at the terminal side, and the specific executive subject is not limited.

With this method, it is determined that the remaining minimum system information control resource set and the associated SS/PBCH block occupy the same beam in the frequency division multiplexing mode; and the configuration parameters of the remaining minimum system information control resource set and the associated SS/PBCH block are determined, wherein the remaining minimum system information control resource sets associated with all SS/PBCH blocks in each SS/PBCH block burst set have the same configuration parameters, to thereby enable the configuration of the remaining minimum system information control resource set to be more flexible when the remaining minimum system information control resource set and the associated SS/PBCH block occupy the same beam in the frequency division multiplexing mode, and to be applicable to more application scenarios.

In one embodiment, the configuration parameters of the remaining minimum system information control resource set include one or any combination of the following parameters:

the bandwidth occupied by the remaining minimum system information control resource set;

the frequency-domain position of the remaining minimum system information control resource set;

the number of continuous or discontinuous time-domain symbols occupied by the remaining minimum system information control resource set;

the time-domain position of the remaining minimum system information control resource set.

In one embodiment, the time-domain position of the remaining minimum system information control resource set is a relative offset value with respect to the associated synchronization signals block.

In one embodiment, the time-domain start position of the remaining minimum system information control resource set is aligned with the start symbol of the associated SS/PBCH block, or the time-domain end position of the remaining minimum system information control resource set is aligned with the end symbol of the associated SS/PBCH block.

In one embodiment, the frequency-domain positions of the remaining minimum system information control resource set and the associated SS/PBCH block satisfy one of the following relationships:

the remaining minimum system information control resource set and the associated SS/PBCH block share the center frequency-domain position, and the remaining minimum system information control resource set is divided into two parts which are symmetrically distributed at upper and lower sides of the associated SS/PBCH block respectively;

the frequency-domain position of the whole remaining minimum system information control resource set is located below the frequency-domain position of the associated SS/PBCH block;

the frequency-domain position of the whole remaining minimum system information control resource set is located above the frequency-domain position of the associated SS/PBCH block.

In one embodiment, the number of continuous or discontinuous time-domain symbols occupied by the remaining minimum system information control resource is 1, 2, 3, 4, 6 or 8.

In one embodiment, the bandwidth occupied by the remaining minimum system information control resource set is one of the following sets: {48, 72, 96}, {24, 36, 48}, {16, 24, 32}, {12, 18, 24}, {8, 12, 16}, {6, 9, 12}.

It should be noted that the content shown in Table 2 in the above embodiment only serve as a combination of the number of continuous or discontinuous time-domain symbols occupied by the remaining minimum system information control resource set with the bandwidth occupied by the remaining minimum system information control resource set. The embodiments of the present application are not limited to the combination shown in Table 2. According to the actual demand, the different numbers of continuous or discontinuous time-domain symbols occupied by the remaining minimum system information control resource set may correspond to different bandwidths occupied by the remaining minimum system information control resource set.

In one embodiment, the relative offset granularity of the frequency-domain positions of the remaining minimum system information control resource set and the associated SS/PBCH block is a preset value.

In one embodiment, the relative offset granularity has different values in different frequency bands or frequency ranges.

In one embodiment, the preset value is a value greater than or equal to zero, that is, the value of c in the above embodiment may be 0 or may be another value greater than 0, which depends on the actual demand.

Figure 9:
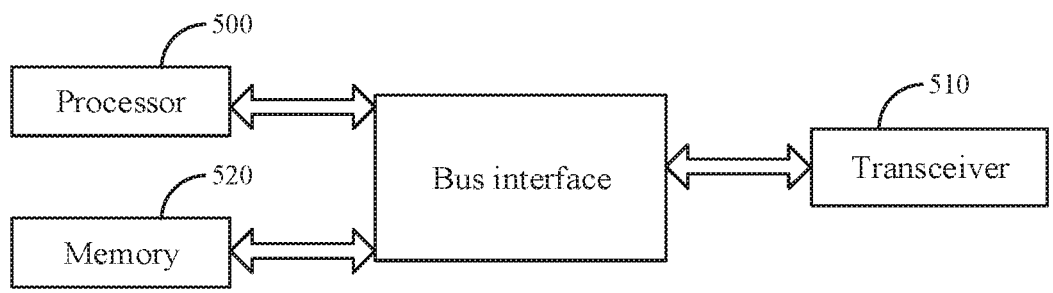
FIG. 9 is a structural schematic diagram of a resource configuration device provided by an embodiment of the present application.

Referring to FIG. 9, a resource configuration device provided by an embodiment of the present application, for example, includes:

a memory 520 configured to store program instructions:

a processor 500 configured to invoke the program instructions stored in the memory, and according to the obtained program, perform the process of:

determining that a remaining minimum system information control resource set and an associated SS/PBCH block occupy a same beam in the frequency division multiplexing mode;

determining the configuration parameters of the remaining minimum system information control resource set and the associated SS/PBCH block, wherein the remaining minimum system information control resource sets associated with all SS/PBCH blocks in each SS/PBCH block burst set have the same configuration parameters.

In one embodiment, the configuration parameters of the remaining minimum system information control resource set include one or any combination of:

the bandwidth occupied by the remaining minimum system information control resource set;

the frequency-domain position of the remaining minimum system information control resource set:

the number of continuous or discontinuous time-domain symbols occupied by the remaining minimum system information control resource set:

the time-domain position of the remaining minimum system information control resource set.

In one embodiment, the time-domain position of the remaining minimum system information control resource set is a relative offset value with respect to the associated SS/PBCH block.

In one embodiment, the time-domain start position of the remaining minimum system information control resource set is aligned with the start symbol of the associated SS/PBCH block, or the time-domain end position of the remaining minimum system information control resource set is aligned with the end symbol of the associated SS/PBCH block.

In one embodiment, the frequency-domain positions of the configured remaining minimum system information control resource set and the associated SS/PBCH block satisfy one of the following relationships:

the remaining minimum system information control resource set and the associated SS/PBCH block share the center frequency-domain position, and the remaining minimum system information control resource set is divided into two parts which are symmetrically distributed at upper and lower sides of the associated SS/PBCH block respectively;

the frequency-domain position of the whole remaining minimum system information control resource set is located below the frequency-domain position of the associated SS/PBCH block:

the frequency-domain position of the whole remaining minimum system information control resource set is located above the frequency-domain position of the associated SS/PBCH block.

In one embodiment, the number of continuous or discontinuous time-domain symbols occupied by the remaining minimum system information control resource is 1, 2, 3, 4, 6 or 8.

In one embodiment, the bandwidth occupied by the remaining minimum system information control resource set is one of the following sets: {48, 72, 96}, {24, 36, 48}, {16, 24, 32}, {12, 18, 24}, {8, 12, 16}, {6, 9, 12}.

In one embodiment, the relative offset granularity of the frequency-domain positions of the remaining minimum system information control resource set and the associated SS/PBCH block is a preset value.

In one embodiment, the relative offset granularity has different values in different frequency bands or frequency ranges.

In one embodiment, the preset value is a value greater than or equal to zero.

A transceiver 510 is configured to receive and transmit the data under the control of the processor 500.

Here, in FIG. 9, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

It should be noted that the device shown in FIG. 9 may be a network-side device or a user equipment-side device. According to the actual demand, other devices not shown in FIG. 9 may further be added and set, and the details thereof will not be described here.

Figure 10:
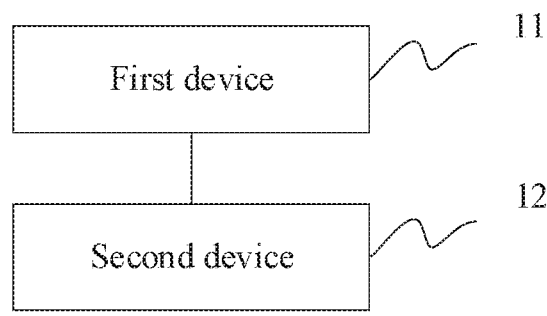
FIG. 10 is a structural schematic diagram of another resource configuration device provided by an embodiment of the present application.

Referring to FIG. 10, another resource configuration device provided by an embodiment of the present application includes:

a first unit 11 configured to determine that a remaining minimum system information control resource set and an associated SS/PBCH block occupy a same beam in the frequency division multiplexing mode;

a second unit 12 configured to determine the configuration parameters of the remaining minimum system information control resource set and the associated SS/PBCH block, wherein the remaining minimum system information control resource sets associated with all SS/PBCH blocks in each SS/PBCH block burst set have the same configuration parameters.

The first unit may be a memory and the second unit may be a processor. That is, the device provided by the embodiment of the present application is not limited to the structure shown in FIG. 9, and may not include components such as transceiver and bus interface.

An embodiment of the present application provides a computer storage medium which is configured to store the computer program instructions used by the above computing device, where the computer program instructions contain the program for performing the above resource configuration method.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application can be applied to the terminal devices, and can also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device can be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the invention.

In summary, in the embodiments of the present application, in consideration of the limitation on the bits of the RMSI CORESET configuration information, the RMSI CORESET is configured more flexibly as much as possible, so that the network may be allowed to deploy different scenarios more flexibly, to meet different scenario requirements.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the invention have been described, those skilled in the art can make additional alterations and modifications to these embodiments once they learn about the basic creative concepts. Thus the attached claims are intended to be interpreted to include the embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A resource configuration method, comprising:
   determining that a remaining minimum system information control resource set and an associated synchronization signal/physical broadcast channel block, SS/PBCH block, occupy a same beam in a frequency division multiplexing mode;
   determining configuration parameters of the remaining minimum system information control resource set and the associated SS/PBCH block, wherein remaining minimum system information control resource sets associated with all SS/PBCH blocks in each SS/PBCH block burst set have same configuration parameters;
   wherein the configuration parameters of the remaining minimum system information control resource set comprise one or any combination of:
   a bandwidth occupied by the remaining minimum system information control resource set;
   a frequency-domain position of the remaining minimum system information control resource set;
   the number of continuous or discontinuous time-domain symbols occupied by the remaining minimum system information control resource set; or
   a time-domain position of the remaining minimum system information control resource set;
   wherein the time-domain position of the remaining minimum system information control resource set is a relative offset value with respect to the associated SS/PBCH block;
   wherein a time-domain start position of the remaining minimum system information control resource set is aligned with a start symbol of the associated SS/PBCH block, or a time-domain end position of the remaining minimum system information control resource set is aligned with an end symbol of the associated SS/PBCH block.

2. The method according to claim 1, wherein a frequency-domain position of the remaining minimum system information control resource set and a frequency-domain of the associated SS/PBCH block satisfy one of following relationships:
   the remaining minimum system information control resource set and the associated SS/PBCH block share a center frequency-domain position, and the remaining minimum system information control resource set is divided into two parts which are symmetrically distributed at upper and lower sides of the associated SS/PBCH block respectively;
   the frequency-domain position of the whole remaining minimum system information control resource set is located below the frequency-domain position of the associated SS/PBCH block;
   the frequency-domain position of the whole remaining minimum system information control resource set is located above the frequency-domain position of the associated SS/PBCH block.

3. The method according to claim 1, wherein the number of continuous or discontinuous time-domain symbols occupied by the remaining minimum system information control resource set is 1, 2, 3, 4, 6 or 8 Orthogonal Frequency Division Multiplexing, OFDM, symbols.

4. The method according to claim 1, wherein the bandwidth occupied by the remaining minimum system information control resource set is one of following sets: {48, 72, 96}, {24, 36, 48}, {16, 24, 32}, {12, 18, 24}, {8, 12, 16}, {6, 9, 12} Physical Resource Blocks, PRBs.

5. The method according to claim 1, wherein a relative offset granularity of a frequency-domain position of the remaining minimum system information control resource set and a frequency-domain of the associated SS/PBCH block is a preset value.

6. The method according to claim 5, wherein the relative offset granularity has different values in different frequency bands or frequency ranges.

7. The method according to claim 5, wherein the preset value is a value greater than or equal to zero.

8. A resource configuration device, comprising:
   a memory configured to store program instructions;
   a processor configured to invoke the program instructions stored in the memory, and according to the obtained program, perform the process of:
   determining that a remaining minimum system information control resource set and an associated SS/PBCH block occupy a same beam in a frequency division multiplexing mode;
   determining configuration parameters of the remaining minimum system information control resource set and the associated SS/PBCH block, wherein remaining minimum system information control resource sets associated with all SS/PBCH blocks in each SS/PBCH block burst set have same configuration parameters;

wherein the configuration parameters of the remaining minimum system information control resource set comprise one or any combination of:
a bandwidth occupied by the remaining minimum system information control resource set;
a frequency-domain position of the remaining minimum system information control resource set;
the number of continuous or discontinuous time-domain symbols occupied by the remaining minimum system information control resource set; or
a time-domain position of the remaining minimum system information control resource set;
wherein the time-domain position of the remaining minimum system information control resource set is a relative offset value with respect to the associated SS/PBCH block;
wherein a time-domain start position of the remaining minimum system information control resource set is aligned with a start symbol of the associated SS/PBCH block, or a time-domain end position of the remaining minimum system information control resource set is aligned with an end symbol of the associated SS/PBCH block.

9. The device according to claim 8, wherein a frequency-domain position of the remaining minimum system information control resource set and a frequency-domain position of the associated SS/PBCH block satisfy one of following relationships:
the remaining minimum system information control resource set and the associated SS/PBCH block share a center frequency-domain position, and the remaining minimum system information control resource set is divided into two parts which are symmetrically distributed at upper and lower sides of the associated SS/PBCH block respectively;
the frequency-domain position of the whole remaining minimum system information control resource set is located below the frequency-domain position of the associated SS/PBCH block;
the frequency-domain position of the whole remaining minimum system information control resource set is located above the frequency-domain position of the associated SS/PBCH block.

10. The device according to claim 8, wherein the number of continuous or discontinuous time-domain symbols occupied by the remaining minimum system information control resource set is 1, 2, 3, 4, 6 or 8 Orthogonal Frequency Division Multiplexing, OFDM, symbols.

11. The device according to claim 8, wherein the bandwidth occupied by the remaining minimum system information control resource set is one of following sets: {48, 72, 96}, {24, 36, 48}, {16, 24, 32}, {12, 18, 24}, {8, 12, 16}, {6, 9, 12} Physical Resource Blocks, PRBs.

12. The device according to claim 8, wherein a relative offset granularity of a frequency-domain position of the remaining minimum system information control resource set and a frequency-domain position of the associated SS/PBCH block is a preset value.

13. The device according to claim 12, wherein the relative offset granularity has different values in different frequency bands or frequency ranges.

14. A non-transitory computer storage medium, wherein the non-transitory computer storage medium stores computer executable instructions which are configured to cause the computer to perform the method of claim 1.

* * * * *